United States Patent [19]
Ho

[11] Patent Number: 5,213,492
[45] Date of Patent: May 25, 1993

[54] COMBUSTION METHOD FOR SIMULTANEOUS CONTROL OF NITROGEN OXIDES AND PRODUCTS OF INCOMPLETE COMBUSTION

[75] Inventor: Min-Da Ho, Somers, N.Y.

[73] Assignee: Praxair Technology, Inc., Danbury, Conn.

[21] Appl. No.: 830,774

[22] Filed: Feb. 6, 1992

Related U.S. Application Data

[63] Continuation of Ser. No. 653,370, Feb. 11, 1991, abandoned.

[51] Int. Cl.$^5$ .............................................. F23M 3/04
[52] U.S. Cl. ........................................ 431/10; 431/190; 431/5; 110/210; 110/214; 422/172; 423/245.3
[58] Field of Search .......................... 431/5, 10, 190; 110/210, 214, 215, 345; 422/172; 423/224, 245.3

[56] References Cited

U.S. PATENT DOCUMENTS

| | | | |
|---|---|---|---|
| 3,355,254 | 11/1967 | Hoskinson | 422/172 |
| 4,078,503 | 3/1978 | Von Dreusche | 110/345 |
| 4,279,208 | 7/1981 | Guillaume et al. | 110/214 |
| 4,329,932 | 5/1982 | Takahashi et al. | 431/10 |
| 4,378,205 | 3/1983 | Anderson | 431/5 |
| 4,408,982 | 10/1983 | Kobayashi et al. | 431/10 |
| 4,541,796 | 9/1985 | Anderson | 431/187 |
| 4,861,262 | 8/1989 | Gitman et al. | 431/5 |
| 4,863,371 | 9/1989 | Ho | 431/9 |
| 4,878,829 | 11/1989 | Anderson | 431/8 |
| 4,907,961 | 3/1990 | Anderson | 431/8 |
| 4,922,841 | 5/1990 | Kent | 110/214 |
| 4,946,382 | 8/1990 | Kobayashi et al. | 431/8 |
| 4,957,050 | 9/1990 | Ho | 110/346 |
| 4,969,814 | 11/1990 | Ho et al. | 431/8 |
| 4,973,346 | 11/1990 | Kobayashi | 65/135 |

Primary Examiner—Carroll B. Dority
Attorney, Agent, or Firm—Stanley Ktorides

[57] ABSTRACT

A combustion method for the simultaneous control of PICs and NO$_x$ wherein the combustion is carried out in two combustion zones. High velocity oxidant is injected into the second combustion zone to aspirate exhaust from the first combustion zone prior to combustion within the second combustion zone. The first combustion zone is preferably operated under pyrolytic conditions.

11 Claims, 2 Drawing Sheets

COMBUSTION METHOD FOR SIMULTANEOUS CONTROL OF NITROGEN OXIDES AND PRODUCTS OF INCOMPLETE COMBUSTION

This application is a continuation of prior U.S. application Ser. No. 653,370, filed Feb. 11, 1991, which is now abandoned.

TECHNICAL FIELD

This invention relates generally to combustion and is particularly applicable to the incineration of waste such as hazardous waste.

BACKGROUND ART

In the burning of combustible material, such as in the incineration of hazardous waste, a problem often arises where the material is not completely combusted. This situation typically occurs due to the highly variable nature of the combustible material supplied for combustion. When material having a high fuel value per unit volume is introduced into a combustion zone for combustion, the oxygen supplied to the combustion zone may not be sufficient to completely combust the material. In addition. The combustion reaction will not be complete if the combustibles, such as waste, are not well-mixed with the oxygen provided to the combustion zone or if cold zones are present in the combustion zone. This results in the generation of products of incomplete combustion (PICs) which not only burden downstream cleaning steps, but also could comprise toxic or otherwise hazardous compounds which may be released to the atmosphere, thus presenting a potential health risk to the operators and to the local population.

Those skilled in this art have addressed this problem by injecting into the combustion zone additional oxygen when it appears that PICs are being generated in excessive amounts. The oxygen may be injected into the combustion zone in the form of air, oxygen-enriched air or technically pure oxygen. The higher the oxygen concentration of the oxidant injected into the combustion zone to deal with the PICs problems, the less is the quantity of unproductive nitrogen which is passed into the combustion which would burden the efficiency of the system and thus a higher oxygen concentration oxidant is preferred. Unfortunately, the higher is the oxygen concentration of the oxidant, the greater is the tendency for the subsequent combustion to form nitrogen oxides ($NO_x$) which are themselves undesirable pollutants resulting from combustion processes. Thus, in attempting to reduce or eliminate one environmental pollutant (PICs) from a combustion reaction, there often results the generation of another environmental pollutant ($NO_x$).

It is thus desirable to have a combustion method which can enable one to carry out a combustion reaction without the generation of excessive amounts of either PICs or $NO_x$.

Accordingly it is an object of this invention to provide a combustion method whereby the generation of products of incomplete combustion is controlled without generating excessive amounts of nitrogen oxides.

SUMMARY OF THE INVENTION

The above and other objects which will become apparent to one skilled in the art upon a reading of this disclosure are attained by the present invention one aspect of which comprises:

A method for combusting material with controlled generation of both nitrogen oxides and products of incomplete combustion comprising:

(A) combusting material in a first combustion zone to produce gaseous exhaust containing products of incomplete combustion;

(B) passing the gaseous exhaust from the first combustion zone into a second combustion zone;

(C) injecting at least one stream of oxidant having an oxygen concentration of at least 25 percent into the second combustion zone at a high velocity sufficient to aspirate gaseous exhaust into the high velocity oxidant stream(s); and (D) combusting products of incomplete combustion contained in the aspirated gaseous exhaust with high velocity oxidant within the second combustion zone.

Another aspect of this invention comprises:

A method for operating a pyrolytic combustion zone for simultaneously controlling the generation of both nitrogen oxides and products of incomplete combustion comprising:

(A) injecting into a combustion zone containing furnace gases including fuel at least one jet of oxidant at a high velocity sufficient to entrain furnace gases including fuel into the jet;

(B) increasing the fuel to oxygen ratio within the jet to exceed the stoichiometric ratio while causing intense mixing of the fuel and oxidant in the combustion zone due to the high velocity jet; and (C) combusting fuel and oxidant in the combustion zone while maintaining the level of nitrogen oxides generation low because of the high fuel to oxygen ratio and while generating products of incomplete combustion because of the high fuel to oxygen ratio but limiting the amount of soot produced because of the intense mixing of fuel and oxidant.

As used herein the term "oxidant jet diameter" means the diameter of the oxidant stream at the point where it emerges from the injection device such as a nozzle.

As used herein the term "soot" means a black substance, comprising very small particles of carbon or heavy hydrocarbons, which appears in smoke often resulting from incomplete combustion.

As used herein the term "blow-off velocity" means the maximum oxidant jet velocity, as measured at the orifice, that will maintain a flame attached to the orifice when the oxidant jet is surrounded by gaseous fuel.

DETAILED DESCRIPTION

Figure 1:
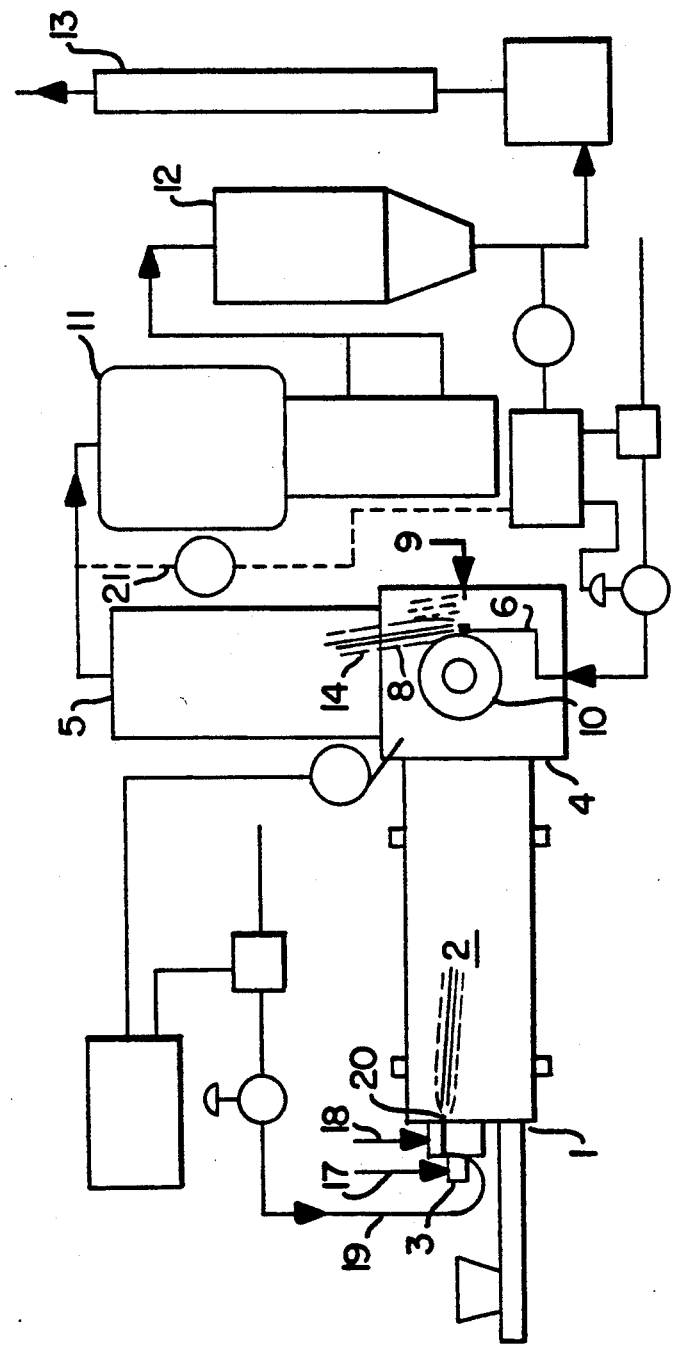
FIG. 1 is a simplified schematic diagram of one embodiment of the invention carried out in conjunction with the incineration of hazardous waste.

In the combustion method of this invention combustible material is provided into a first combustion zone. The combustible material or fuel may be in solid, liquid, gaseous or mixed phase form and may be provided into the first combustion zone separately from or with the oxidant for combustion. The invention will have particular utility with combustible material which has a highly variable heating value per unit volume and/or which is supplied into the first combustion zone at a highly variable rate. Examples of combustible material or fuel which may be employed with the combustion method of this invention include coal, wood, lignite, heavy oil, trash, solid and/or liquid waste, aqueous plant effluent and hazardous waste. Typically when the fuel is in solid or liquid form, gaseous fuel will volatize from the solid or liquid.

The oxidant employed in the first combustion zone may be air, oxygen-enriched air and/or technically pure oxygen and may be supplied with the combustible material such as through a burner or as a separate oxidant stream such as through a lance. Air may also pass into the first combustion zone by infiltration.

Within the first combustion zone the combustible material is combusted to produce gaseous exhaust which comprises products of complete combustion, such as carbon dioxide and water vapor, and also products of incomplete combustion. A product of incomplete combustion or PIC may be defined as a species which can undergo oxidation or further oxidation under combustion zone conditions of temperature and pressure. Examples of well known PICs include carbon monoxide, hydrocarbons, soot and chlorinated hydrocarbons such as dioxins and furans.

The gaseous exhaust is then Passed from the first combustion zone into a second combustion zone which may be integral with the first combustion zone or may be separate from the first combustion zone and connected therewith by a conduit or other passageway. In the incineration of hazardous waste the first combustion zone may be the primary combustion chamber of an incineration system and the second combustion zone may be the secondary combustion chamber of such a system. Frequently the primary combustion chamber of an incineration system comprises a rotary kiln. The primary combustion chamber is often used for handling solid or sludge waste while the secondary combustion chamber is used to treat the gaseous exhaust from the primary combustion chamber to ensure good destruction of the waste by operating at a higher temperature and providing sufficient gas residence time to ensure the destruction of the waste.

At least one high velocity oxidant stream having an oxygen concentration of at least 25 percent, and preferably at least 30 percent, is injected into the second combustion zone. Most preferably the high velocity oxidant is technically pure oxygen having an oxygen concentration of 99.5 percent or more. Typically the high velocity oxidant will have a velocity of at least 300 feet per second and generally the velocity will be within the range of from 400 to 1500 feet per second. The velocity is sufficiently high to cause exhaust gases to aspirate into the oxidant. The aspiration may occur within the second combustion zone and/or may occur upstream of the second combustion zone. The aspiration enables the exhaust gas and in particular the PICs within the exhaust gas to intimately mix with the oxidant resulting in the subsequent combustion being stable with the avoidance of hot spots which would favor $NO_x$ formation and would cause refractory damage. Moreover the products of complete combustion from the combustion reaction, e.g. carbon dioxide and water vapor, within the exhaust gas which are also aspirated into the high velocity oxidant serve as ballast for the combustion reaction whereby the combustion reaction is spread out and heat from the combustion reaction is absorbed by this heat sink. This further inhibits $NO_x$ formation.

After aspiration of exhaust gas into the high velocity oxidant, products of incomplete combustion combust with the oxidant within the second combustion zone. If desired, additional fuel and/or oxidant may be provided into the second combustion zone to carry out combustion.

The high velocity oxidant is injected into the second combustion zone in a manner such that there is no impingement of the oxidant jet on the walls of the second combustion zone within about 300 oxidant jet diameters from the high velocity oxidant injection point. Preferably the high velocity oxidant is injected into the second combustion zone with an orientation substantially parallel to the axial direction of the second combustion zone. In this way local overheating which may cause refractory damage as well as excessive $NO_x$ generation is avoided.

Preferably the high velocity oxidant is injected into the second combustion zone in a plurality of streams. Generally the number of high velocity oxidant streams will be within the range of from 30 to 50. The plurality of high velocity oxidant streams may be injected parallel to each other. However, since neighboring parallel streams would generally immediately merge into a single jet, it is preferred that at least two, and preferably most of the Plurality of high velocity oxidant streams be injected as outwardly diverging streams. In a particularly preferred embodiment, the outwardly diverging streams in close proximity converge after aspiration of PICs-containing exhaust gas into the oxidant. The use of a plurality of streams improves the overall aspiration of exhaust gas into the oxidant and the use of outwardly diverging oxidant streams further improves the completeness of the aspiration, thus serving to ensure that PICs do not bypass the flame zone in the second combustion zone while further retarding $NO_x$ formation. The downstream convergence of the outwardly divergent streams bring the PICs together with the oxidant in a manner which improves the complete combustion of these species within the second combustion zone. It also prevents flame impingement on the furnace or combustion zone walls so as to avoid overheating of refractory or slagging.

A preferred embodiment of this invention involves the injection of the oxidant through a plurality of orifices as a cluster, such as on a nozzle, such that the farther away from the center of the cluster, the greater is the divergent angle of the orifice. This embodiment has the advantage of promoting staged combustion thus further reducing flame temperature and $NO_x$ formation.

In order to further improve the temperature control of the combustion carried out within the second combustion zone, atomized water or another coolant may be provided into the second combustion zone. When such auxiliary coolant is employed, it is preferred that it be provided in such manner that it also is aspirated into the high velocity oxidant either prior to combustion or during the combustion.

In the practice of this invention, it is sometimes preferred that the first combustion zone be operated under pyrolytic or fuel-rich conditions. Fuel-rich conditions within the first combustion reduce the gas volumetric flow within the first combustion zone, thus reducing the particulate carryover to the second combustion zone. Moreover, fuel-rich conditions within the first combustion zone could lead to a more stable temperature and thus to a more stable generation of combustible vapors which reduces the fluctuation of oxygen demand while significantly reducing the fuel requirement in the second combustion zone. As a result a higher throughput can be achieved.

It is often thought that in a fuel-rich combustion zone the formation of $NO_x$ would be necessarily low. However, this is not generally true in a mixing-limited combustion process (as opposed to premixed combustion). The problem is that at the local interface of fuel and oxidant, there is often still sufficient excess oxygen and high temperature to generate $NO_x$ at significant rates. With the use of a small-diameter high-velocity oxidant jet, preferably wherein the velocity of oxidant jet exceeds the blow-off velocity, fuel containing furnace gas is being rapidly aspirated into the jet. Therefore, the fuel/oxygen ratio is quickly increased beyond the stoichiometric ratio and the equilibrium flame temperature of the mixture is quickly reduced due to the entrainment of excess fuel and combustion products. Meanwhile the initial jet velocity is too high for combustion to take place. As a result, the gas residence time at conditions suitable for $NO_x$ generation (i.e. high temperature, excess oxygen) is too short for any significant generation of $NO_x$. Furthermore, the aspiration effect of the high velocity jet creates intense mixing and strong recirculation of the furnace gas. This minimizes the probability of local excess oxygen.

The intensive mixing of the furnace gas in a fuel-rich combustion zone promotes the gasification of the organic materials to form gaseous fuels, such as carbon monoxide, hydrogen and methane, while it minimizes the formation of soot particles. Soot particles are a source of PICs and may be difficult to burn out in the secondary combustion zone once they are formed. Depending on the amount of oxygen available, at a sufficiently high temperature, volatiles would undergo chemical reactions including pyrolysis (thermal cracking), partial oxidation (also known as oxidative pyrolysis) or complete oxidation. If the local oxygen/carbon ratio is low and/or the free radical concentrations are low, heavy hydrocarbons (soot) are formed through polymerization (recombination) reactions. With the use of high velocity jets to enhance the mixing and recirculation of the gas stream, a more uniform profile of local oxygen/carbon ratios is obtained.

Oxygen can be supplied not only by oxygen molecules but also by steam and carbon dioxide. Internal recirculation within the combustion zone caused by the high velocity oxidant enables steam and/or carbon dioxide generated by the drying or combustion of material within the combustion zone, such as solid waste, to be beneficially used for soot reduction. In addition, the vigorous mixing and recirculation within the combustion zone distributes free radicals uniformly throughout the combustion zone thus helping to further reduce the formation of soot.

The preferred method of the invention is to use multiple streams of jets so that smaller diameter jets can be used. Preferably, the diameter of each jet is less than 1/100 of the diameter or width of the combustion chamber or zone. The smaller the diameter, the quicker the aspiration takes place and the smaller is the turbulence scale. A particularly preferred embodiment of the invention is the use of the multiple-stream, divergent-converging configuration described earlier. The luminous flame size is increased due to this divergent-converging configuration compared to a single stream flame, leading to greater radiative heat transfer to the heat load. The velocity of the high velocity jet or jets will generally be within the range of from 400 to 1500 feet per second.

In the practice of this invention, it is preferred that the second combustion zone be operated under oxidative or oxygen-rich conditions. This ensures that all combustibles are completely combusted so that undesired emissions to the atmosphere are eliminated. The injection rate and duration of the high velocity oxidant injected into the second combustion zone may be increased or decreased in order to maintain the desired level of excess oxygen within the second combustions zone. The primary way of maintaining the desired level of excess oxygen within the second combustion zone is to monitor the oxygen concentration within the second combustion zone or within the effluent from the second combustion zone and adjust the high velocity oxidant flow accordingly. A preferred supplemental method of maintaining a sufficient level of excess oxygen within the second combustion zone is to monitor the carbon monoxide concentration within the second combustion zone or within the effluent and to increase the oxygen concentration set point or increase the oxidant flow accordingly. Other parameters of the effluent which may be monitored to maintain the desired oxidative conditions within the second combustion zone include opacity and luminosity.

The following Example is provided to further illustrate the invention and the benefits attainable thereby. The Example is not intended to be limiting.

EXAMPLE

Figure 2:
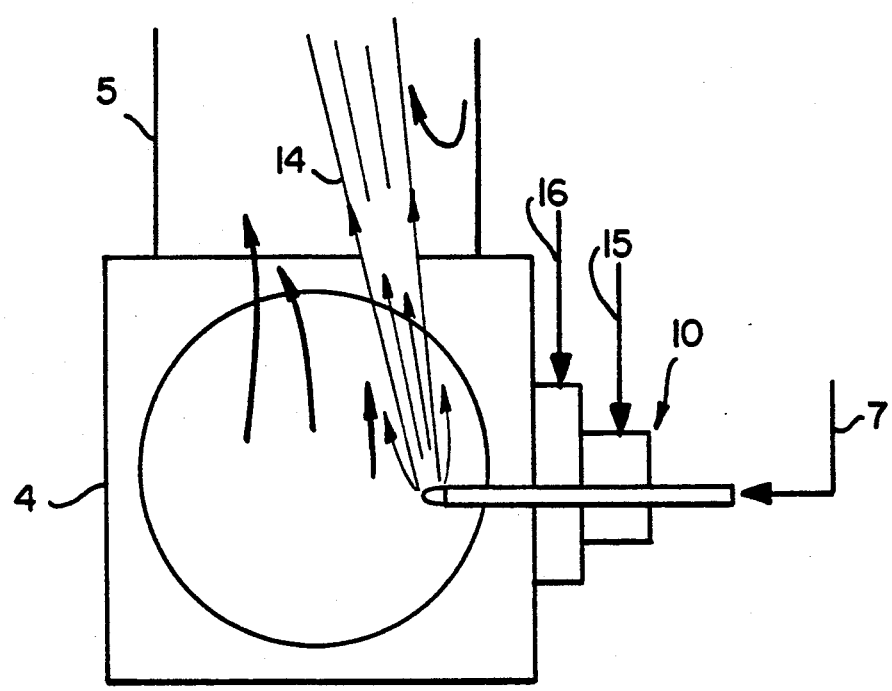
FIG. 2 is a more detailed view of the embodiment illustrated in FIG. 1 showing in greater detail the injection of high velocity oxidant and the aspiration thereinto of exhaust gases.

The invention was carried out in conjunction with the incineration of hazardous waste employing a system such as illustrated in FIGS. 1 and 2. The numerals in the Figures are the same for the common elements.

Referring now to the Figures, hazardous waste comprising oily sludge and contaminated soil was provided at a rate of 4.1 tons per hour through input means 1 into rotary kiln 2 which was the first combustion zone of the invention. Natural gas 17 and air 18 were provided into kiln 2 through burner 3 and oxygen 19 was provided into kiln 2 through lance 20. The hazardous waste was combusted under pyrolytic conditions to produce exhaust gas which included products of incomplete combustion. In this case the PICs comprised carbon monoxide, methane and other unknown organic components. The oxygen flow into the rotary kiln was adjusted to maintain the kiln 2 exit temperature near the desired level which ensured the removal of hazardous waste from the ash without overheating the ash.

The gaseous exhaust was passed from kiln 2 into transition chamber 4 and from there into secondary combustion chamber 5. Chambers 4 and 5 are the second combustion zone of this invention. In proximity to the flow of the gaseous exhaust through transition chamber 4 there was injected through lance 6 technically pure oxygen 7 in over 30 diverging streams 8 at a velocity of up to 1500 feet per second toward and into secondary combustion chamber 5. All of the high velocity oxidant streams 8 converged into combined jet 14. A small amount of natural gas 15 and air 16 were also supplied through a burner 10 to assist the combustion within chamber 4. Atomized water spray 9 was also supplied into chamber 4. The gaseous exhaust and the atomized water were aspirated into the high velocity oxidant streams and combustion was carried out in transition chamber 4 and in secondary combustion chamber 5. Oxidative conditions were maintained throughout the combustion in chamber 5 by monitoring the oxygen concentration of the flue gas at the exit of chamber 5 as a process variable. The process variable was compared with a desired set point to determine the desired flowrate of oxygen using a proportional-integral-derivative (PID) controller as indicated by line 21 and the oxygen flow rate was increased whenever the oxygen level in the effluent fell below a predetermined level. In addition the desired oxygen flow rate was increased whenever the carbon monoxide level in the flue gas exceeded 20 ppm.

Exhaust or effluent from chamber 5 was passed through spray tower 11 and baghouse 12 and then exhausted to the atmosphere through stack 13. There were no appreciable levels of carbon monoxide in the exhaust gases passing up stack 13 thus indicating that all PICs were completely combusted. Minimal soot formation was observed in the combustion process. Moreover the $NO_x$ level was well within acceptable levels.

For comparative purposes a procedure similar to that described above was carried out except the injection of high velocity oxidant into the second combustion zone was not employed. The processing rate for hazardous waste could not exceed 2.5 tons per hour without the frequent excursions of significant levels of carbon monoxide in the effluent released to the atmosphere.

Although the invention has been described in detail with reference to certain embodiments, those skilled in the art will recognize that there are other embodiments within the spirit and scope of the claims.

I claim:

1. A method for combusting material with controlled generation of both nitrogen oxides and products of incomplete combustion comprising:
    (A) combusting material in a first combustion zone to produce gaseous exhaust containing products of incomplete combustion and products of complete combustion;
    (B) passing the gaseous exhaust from the first combustion zone into a second combustion zone having a width and an axial direction;
    (C) injecting through a lance with an orientation substantially parallel to said axial direction at least one stream of oxidant, without fuel, having a diameter less than 1/100 of the width of the second combustion zone and having an oxygen concentration of at least 30 percent into the second combustion zone at a high velocity of at least 300 feet per second;
    (D) aspirating products of incomplete combustion into the high velocity oxidant;
    (E) combusting products of incomplete combustion aspirated into the high velocity oxidant with high velocity oxidant within the second combustion zone to carry out a stable combustion by the mixing of the aspirated products of incomplete combustion with the high velocity oxidant; and
    (F) spreading out the combustion reaction by aspiration of products of complete combustion into the oxidant, said products of complete combustion also serving as a heat sink, to inhibit $NO_x$ formation.

2. The method of claim 1 wherein the high velocity oxidant is injected in a plurality of streams.

3. The method of claim 1 wherein the high velocity oxidant is technically pure oxygen.

4. The method of claim 1 further comprising the aspiration of coolant into the high velocity oxidant.

5. The method of claim 4 wherein the coolant is atomized water.

6. The method of claim 1 wherein aspiration of products of incomplete combustion and products of complete combustion into the high velocity oxidant occurs within the second combustion zone.

7. The method of claim 1 wherein combustion within the first combustion zone is carried out under pyrolytic conditions.

8. The method of claim 1 wherein the combustion within the second combustion zone is carried out under oxidative conditions.

9. The method of claim 1 wherein the combustion within the first combustion zone is carried out under pyrolytic conditions and the combustion within the second combustion zone is carried out under oxidative conditions.

10. The method of claim 1 wherein the level of oxygen within the second combustion zone is maintained at a desired level by monitoring the level of oxygen within the second combustion zone or within the effluent passed out from the second combustion zone and increasing the flow of high velocity oxidant into the second combustion zone when the level of oxygen within the effluent falls below a predetermined level.

11. The method of claim 1 wherein the level of oxygen within the second combustion zone is maintained at a desired level by monitoring the level of carbon monoxide within the second combustion zone or within the effluent passed out from the second combustion zone and increasing the flow of high velocity oxidant into the second combustion zone when the level of carbon monoxide within the second combustion zone or effluent exceeds a predetermined level.

* * * * *